United States Patent
Zhang

(10) Patent No.: US 7,278,042 B2
(45) Date of Patent: Oct. 2, 2007

(54) CIRCUIT FOR PROTECTING A MOTHERBOARD BY REMOVING POWER TO THE MOTHERBOARD BASED ON THE STATUS OF AN ATTACHED COMPONENT

(75) Inventor: Xiang Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 120 days.

(21) Appl. No.: 11/306,523

(22) Filed: Dec. 30, 2005

(65) Prior Publication Data

US 2007/0157033 A1    Jul. 5, 2007

(51) Int. Cl.
*G06F 1/00* (2006.01)
*G06F 11/30* (2006.01)

(52) U.S. Cl. .................. 713/340; 713/300; 713/310

(58) Field of Classification Search ............... 713/300, 713/310, 340
See application file for complete search history.

(56) References Cited

U.S. PATENT DOCUMENTS

| 6,275,949 | B1 * | 8/2001 | Watanabe | 713/324 |
| 6,970,338 | B2 | 11/2005 | Ju | |
| 2005/0114716 | A1 * | 5/2005 | O | 713/300 |

* cited by examiner

*Primary Examiner*—James K. Trujillo
*Assistant Examiner*—Anand B. Patel
(74) *Attorney, Agent, or Firm*—Wei Te Chung

(57) ABSTRACT

A circuit for protecting a motherboard if a component is not connected properly to its power source, a startup circuit (50) connected to a switch, and a monitoring circuit (70) monitoring the status of the component. The startup circuit provides a control signal to a power supply (10) via the switch for controlling the power supply providing power to the motherboard. The monitoring circuit outputs a monitoring signal to the switch to control the switch to be on or off, so as to control the transfer of the control signal.

15 Claims, 3 Drawing Sheets

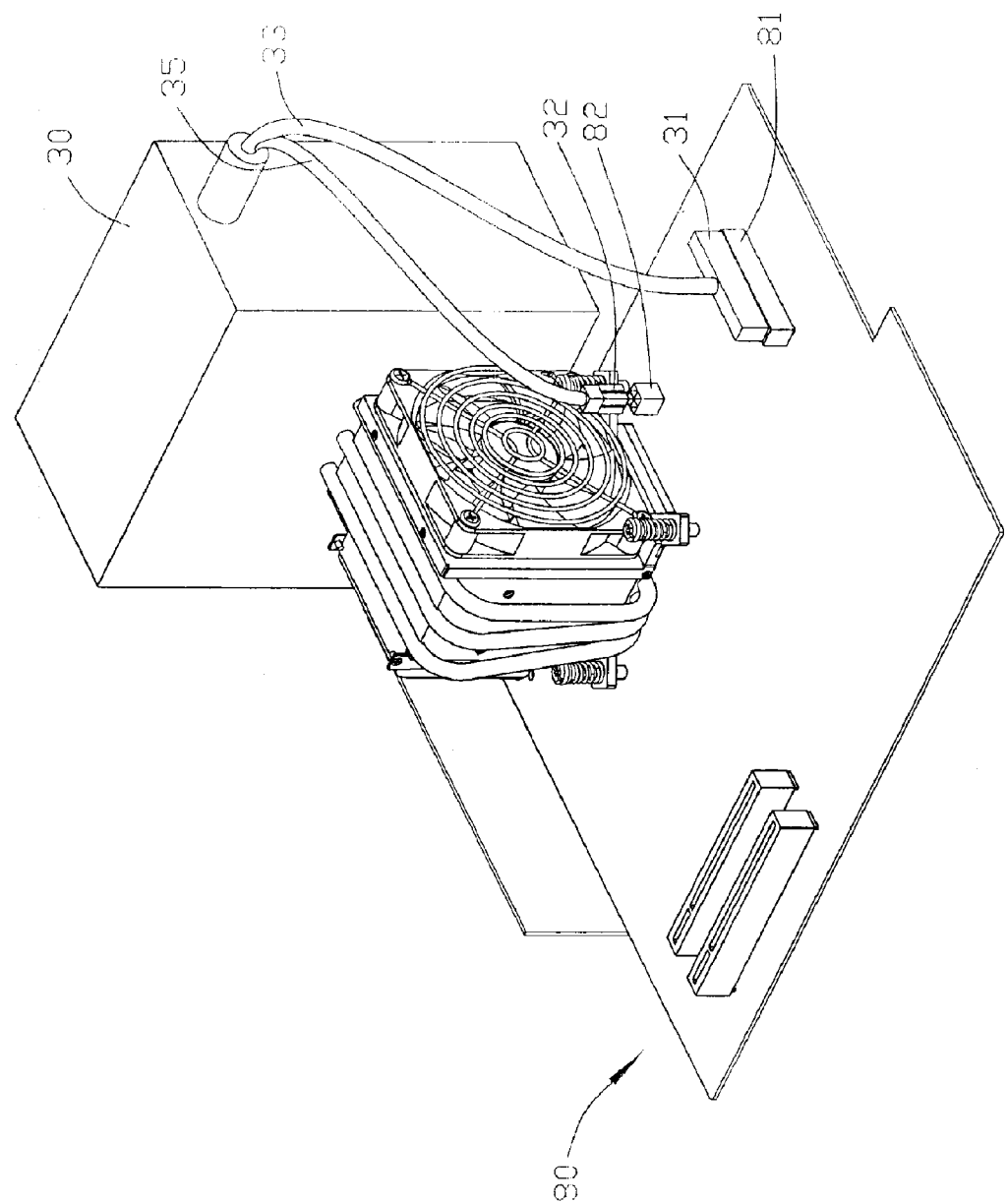
Fig. 3 <PRIOR ART>

US 7,278,042 B2

CIRCUIT FOR PROTECTING A MOTHERBOARD BY REMOVING POWER TO THE MOTHERBOARD BASED ON THE STATUS OF AN ATTACHED COMPONENT

FIELD OF THE INVENTION

The present invention relates to a circuit, and more particularly to a circuit for protecting a computer motherboard from damage.

DESCRIPTION OF RELATED ART

Recent technical innovations have created faster central processing units (CPUs) for speeding up the data processing rate of a computer. However, the faster CPUs use much more power. Conventional motherboards cannot supply sufficient power to support these CPUs, so power supplies need to provide a special power cable for the CPU. At present, graphics cards on motherboards also require additional power directly from the power supply. In the future, more and more components on the motherboards will need to obtain power directly from the power supplies via special power cables.

As "Do It Yourself" becomes more and more popular in computer assembly or reassembly, users often work with the motherboard themselves for removing or adding some components during assembly or reassembly of the computer. For example, FIG. 3 is illustrated for showing this situation. A conventional power supply 30 is connected to a motherboard 80 via special cables 33, 35 extending from the power supply 30. More specifically, the motherboard 80 has a motherboard power receptacle 81 and a CPU power receptacle 82 mounded thereon for respectively receiving power from the power supply 30 and passing the power to the motherboard 80 and the CPU respectively. A motherboard power plug 31 electrically integrated with the cable 33 is detachably connected to the motherboard power receptacle 81. A CPU power plug 32 electrically integrated with the cable 35 is detachably connected to the CPU power receptacle 82. However, normally the motherboard power plug 81 is connected to the motherboard power receptacle 81, and the CPU power plug 82 is connected to the CPU power receptacle 82. During an assembly or a reassembly procedure, sometimes the users need to disconnect the motherboard power plug 31 and the CPU power plug 32 temporarily from the motherboard power receptacle 81 and the CPU power receptacle 82 for easy operation. However, sometimes the users are apt to overlook the temporary disconnection, such as the temporary disconnection between the CPU power plug 82 and the CPU power receptacle 32 as shown in FIG. 4, and forget to put them back to the original connection. If the computer is powered on in this case, some components such as the CPU (not shown) on the motherboard may not operate properly and might even cause damage to the components or the motherboard.

What is needed, therefore, is a circuit on a motherboard which can protect the motherboard and its components from damage in the above situation.

SUMMARY OF INVENTION circuit for protecting a motherboard if a component is not connected properly to its power source, includes a switch, a startup circuit connected to the switch, and a monitoring circuit monitoring the status of the component. The startup circuit provides a control signal to a power supply via the switch for controlling the power supply providing power to the motherboard. The monitoring circuit outputs a monitoring signal to the switch that controls the switch to be on or off, so as to control the transfer of the control signal.

Other advantages and novel features will be drawn from the following detailed description of a preferred embodiment with attached drawings, in which:

BRIEF DESCRIPTION OF DRAWINGS

FIG. 3 is a schematic view of a conventional motherboard connected to a power supply.

DETAILED DESCRIPTION

Figure 1:
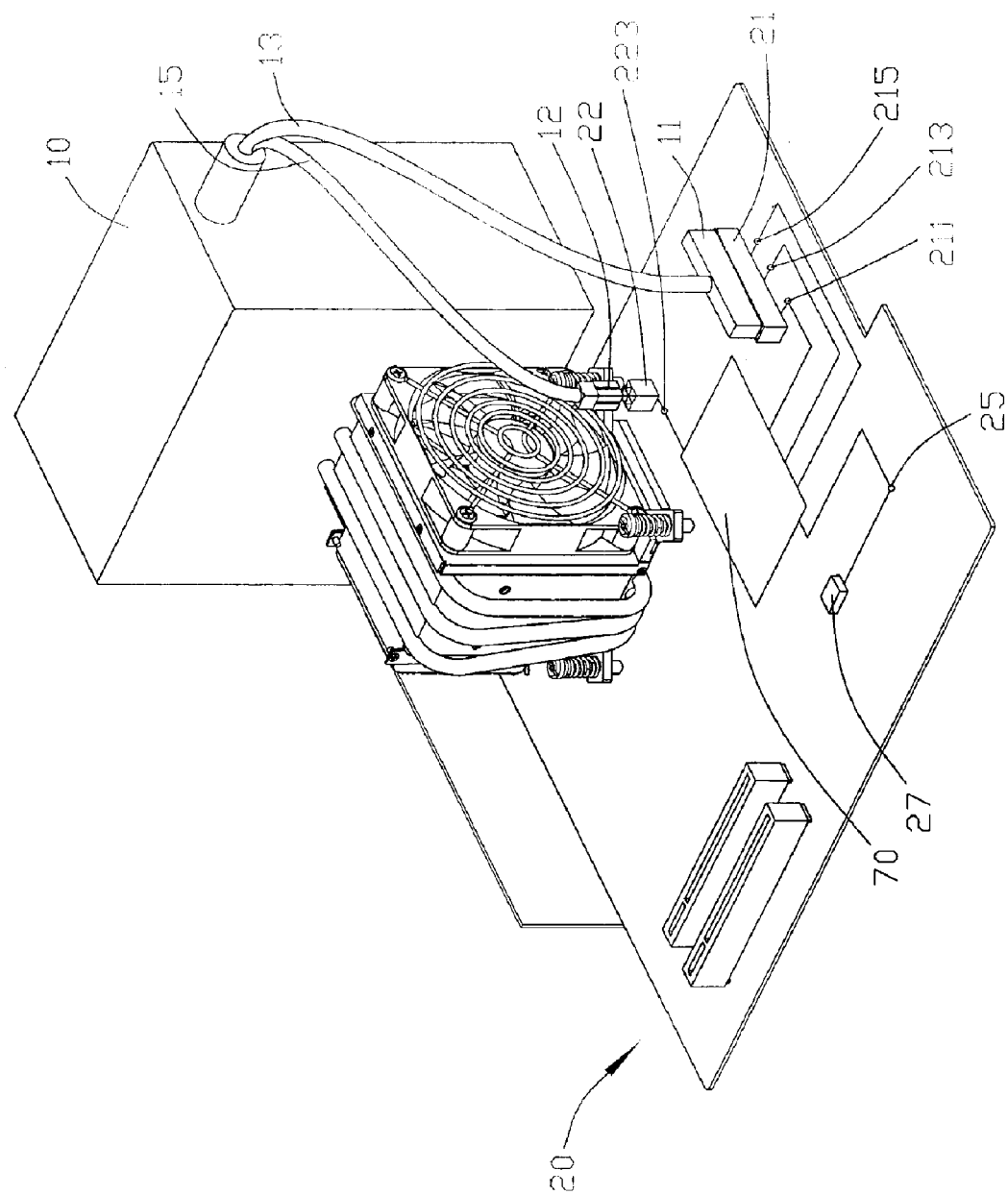
FIG. 1 is a schematic view of a motherboard with a circuit for protecting the motherboard.

Referring to FIG. 1, a circuit 70 for protecting a motherboard 20 in accordance with a preferred embodiment of the present invention is set on the motherboard 20.

A power supply 10 is connected to the motherboard 20 via a first cable 13 and a second cable 15 extending from the power supply 10. The motherboard 20 has a motherboard power receptacle 21 and a CPU power receptacle 22 mounded thereon for respectively receiving power from the power supply 10 and passing the power to the motherboard 20 and the CPU respectively. A motherboard power plug 11 electrically integrated with the first cable 13 is detachably connected to the motherboard power receptacle 21. A CPU power plug 12 electrically integrated with the second cable 15 is detachably connected to the CPU power receptacle 22.

The motherboard power receptacle 21 includes a pin 211, a pin 213, and a pin 215. The pin 211 is used to transfer a signal PS-ON to the power supply 10. When the pin 211 is enabled at a low level and transfers a low level signal to the power supply 10, the power supply 10 provides power to the motherboard 20. When the pin 211 is enabled at a high level and transfers a high level signal to the power supply 10, the power supply 10 stops providing power to the motherboard 20. When the power supply 10 supplies correct power to the motherboard 20 and the CPU, the power supply generates a signal PWROK to the motherboard via the pin 213 of the motherboard power receptacle 21. The pin 215 is enabled at +5V by the power supply 10 at all times, even when the computer is shut off.

The CPU power receptacle 22 includes a pin 223. The pin 223 receives a component status signal that indicates a voltage of the CPU. When the CPU power-on voltage is normal, the pin 223 is enabled at a high level. When the CPU power-on voltage is abnormal, the pin 223 is enabled at a low level.

The motherboard 10 also includes a control terminal 25. The control terminal 25 is used to power on or shut off the computer. The control terminal 25 receives a signal from a chip 27 (such as a north bridge chip) to control powering on or shutting off the computer. The control terminal 25 receives a low level signal when a user shuts off the computer, and the control terminal 25 receives a high level signal when a user starts up the computer.

As shown in FIG. 1, the motherboard power plug 11 is inserted into the motherboard power receptacle 21 for providing power to the motherboard 20, but the CPU power plug 12 is not inserted into the CPU power receptacle 22. The circuit 70 is useful in the above situation to protect the motherboard 10 from damage because it will stop power to the motherboard 10 thereby preventing damage.

Figure 2:
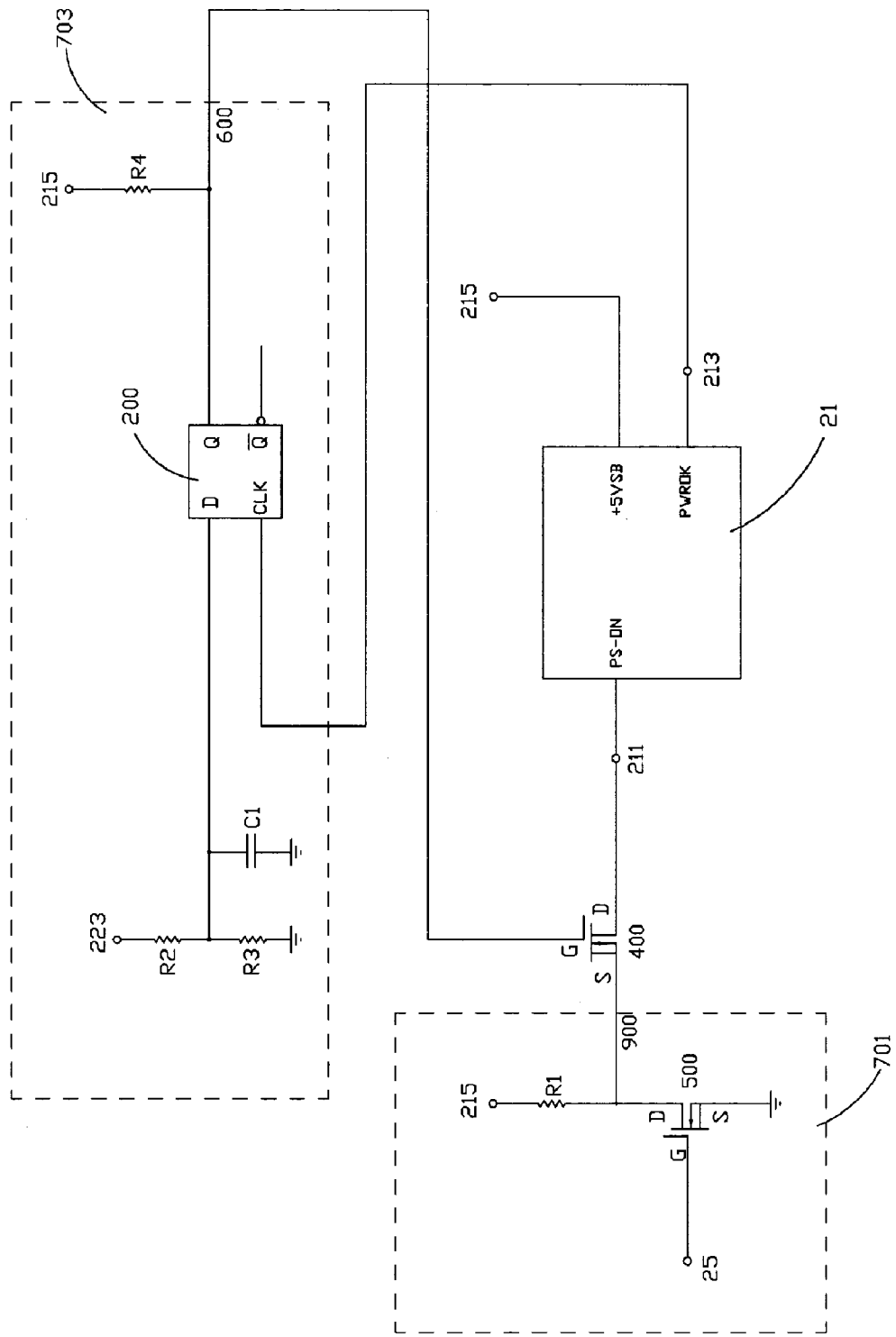
FIG. 2 is a schematic view of the circuit of FIG. 1 in accordance with a preferred embodiment of the present invention.

Referring to FIG. 2, the circuit 70 includes a startup circuit 701, a monitoring circuit 703, and a switch. In the present embodiment, the switch is a first transistor 400.

The startup circuit 701 is connected to a source of the first transistor 400, and transfers a control signal 900 to the source of the first transistor 400. The startup circuit 701 includes a second transistor 500 and a first resistor R1. One end of the first resistor R1 is connected to the pin 215, and the other end is connected to a drain of the second transistor 500. The drain of the second transistor 500 is connected to the source of the first transistor 400. The control signal 900 is created at the drain of the second transistor 500. A source of the second transistor 500 is connected to ground. A gate of the second transistor 500 is connected to the control terminal 25.

The monitoring circuit 703 is connected to a gate of the first transistor 400, and transfers a monitoring signal 600 to the gate of the first transistor 400. The monitoring circuit 703 includes a flip-flop 200, two voltage grading resistors R2, R3, and a fourth resistor R4.

The flip-flop 200 has an input terminal D, a clock terminal C, and an output terminal Q. The truth table of the flip-flop 200 is shown below:

| Input | Input | Output |
|---|---|---|
| CLK | D | Q |
| rising edge | H | H |
| rising edge | L | L |
| L | X | $Q_0$ |

In the above table, an "H" indicates a high level signal, an "L" indicates a low level signal, an "X" indicates an uncertain signal, and a $Q_0$ indicates a previous output Q. It can be seen from the table that when the flip-flop 200 latches a signal at the input terminal D at a rising edge of a clock signal fed to the clock terminal CLK, the output terminal Q outputs the monitoring signal 600.

The output terminal Q is connected to the gate of the first transistor 400. The clock terminal CLK is coupled to the pin 213 of the motherboard power receptacle 21. The pin 223 of the CPU power receptacle 22 is coupled to one end of the voltage grading resistor R2. The other end of voltage grading resistor R2 is connected to the input terminal D of the flip-flop 20 and one end of the voltage grading resistor R3. The other end of the voltage grading resistor R3 is connected to ground. A capacitor C1 is connected between the input terminal D of the flip-flop 200 and ground for protecting the flip-flop 200. The pin 215 is coupled to the output terminal Q of the flip-flop 200 via the fourth resistor R4.

A drain of the first transistor 400 is coupled to the pin 211 of the motherboard power receptacle 21.

Before the computer is powered on, the pin 213 is at a low level. The gate of the first transistor 400 is in enabled at a high level for the high level pin 215. The control terminal 25 is at a low level, and the second transistor 500 is switched off. The source of the first transistor 400 is enabled at a high level for the high level pin 215. So the voltage difference between the gate and the source of the first transistor 400 is too small to switch on the first transistor 400.

When a user starts up the computer, the control terminal 25 is enabled at a high level, and the second transistor 500 is switched on. The drain of the second transistor 500 and the source of the first transistor 400 are connected to ground, and the low level control signal 900 is created. The voltage difference between the gate and the source of the first transistor 400 is great enough to switch on the first transistor 400. The low level control signal 900 at the drain of the second transistor 500 is transferred to the computer via the pin 211 of the motherboard power receptacle 21, so the power supply 10 starts providing power to the computer. Then, the pin 213 of the motherboard power receptacle 21 is changed from low level to high level to trigger the flip-flop 200.

Then, if the CPU power plug 12 is plugged into the motherboard power receptacle 22, the pin 213 is enabled at a high level. The input signal of the input terminal D of the flip-flop 200 is a high-voltage signal, and the output terminal Q outputs a high voltage monitoring signal 600 to the gate of the first transistor 400. The voltage difference between the gate and source of the first transistor 400 is great enough to switch on the first transistor 400. The control signal 900 at the drain of the second transistor 500 is transferred to the pin 211 of the motherboard power receptacle 21, so the power supply 10 continues to provide power to the computer.

If the CPU power plug 12 is not plugged into the motherboard power receptacle 22, the pin 223 is at a low level. The input signal of the input terminal D of the flip-flop 200 is a low-voltage signal, and the output terminal Q outputs a low-voltage signal 600 to the gate of the first transistor 400. The voltage difference between the gate and source of the first transistor 400 is too small to switch on the first transistor 400. The control signal 900 at the drain of the second transistor 500 can not be transferred to the pin 211 of the motherboard power receptacle 21, and the pin 211 of the motherboard power receptacle 21 can not be enabled at a low level, so the power supply 10 stops providing power to the computer to protect the motherboard and its components.

The described above is a preferred embodiment of the present invention. The present invention can also be used in other similar cases. For example, the present invention can be used to check if a graphics card on a motherboard is powered normally. A signal that indicates the status of the graphics card substitutes the CPU power-on voltage in the above embodiment.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for protecting a motherboard if a component is not connected properly to its power source, comprising:
    a switch;
    a startup circuit connected to the switch, the startup circuit providing a control signal to a power supply via the switch for controlling the power supplied to the motherboard; and
    a monitoring circuit monitoring the status of the component, and outputting a monitoring signal to the switch to control the switch to be on or off, controlling the transfer of the control signal.

2. The circuit as described in claim 1, wherein the switch is a first transistor, the startup circuit is connected to a source of the first transistor, the monitoring circuit is connected to a gate of the first transistor, and the control signal is output from a drain of the transistor.

3. The circuit as described in claim 2, wherein the startup circuit comprises a second transistor, whose drain is connected to the source of the first transistor, and creates the control signal.

4. The circuit as described in claim 1, wherein the monitoring circuit comprises a flip-flop, an input terminal of the flip-flop receives a component status signal, an output terminal of the flip-flop outputs the monitoring signal.

5. The circuit as described in claim 4, wherein the component status signal indicates a voltage of the CPU.

6. The circuit as described in claim 4, wherein a clock terminal of the flip-flop receives a high level signal to trigger the flip-flop when the power supply provides correct power.

7. The circuit as described in claim 4, wherein a capacitor is connected to the input terminal of the flip-flop to protect the flip-flop.

8. The circuit as described in claim 4, wherein the output terminal of the flip-flop receives a +5V signal that is provided by the power supply at all times.

9. A circuit for protecting a motherboard if a component is not connected properly to its power source, comprising:
   a flip-flop, an input terminal of the flip-flop receiving a component status signal; and
   a first transistor, a gate of the first transistor connected to an output terminal of the flip-flop, a source of the first transistor receiving a control signal for controlling a power supply providing power to the motherboard, a drain of the first transistor connected to the power supply;
   wherein when the flip-flop is triggered, an output terminal of the flip-flop outputs the component status signal to the gate of the first transistor to control the first transistor to be on or off, to control the transfer of the control signal to the power supply.

10. The circuit as described in claim 9, wherein the control signal is generated by a startup circuit, the startup circuit comprises a second transistor, whose drain is connected to the source of the first transistor, and creates the control signal.

11. The circuit as described in claim 9, wherein the component status signal indicates a voltage of the CPU.

12. The circuit as described in claim 9, wherein the component status signal is coupled to the input terminal of the flip-flop via two voltage grading resistors.

13. The circuit as described in claim 9, wherein a clock terminal of the flip-flop receives a high level signal to trigger the flip-flop when the power supply provides correct power.

14. The circuit as described in claim 9, wherein a capacitor is connected to the input terminal of the flip-flop to protect the flip-flop.

15. The circuit as described in claim 9, wherein the output terminal of the flip-flop receives a +5V signal that is provided by the power supply at all times.

* * * * *